United States Patent [19]
Mistarz

[11] 3,847,014
[45] Nov. 12, 1974

[54] ENCLOSURE LEAK TESTER AND METHOD

[75] Inventor: Robert J. Mistarz, North Brook, Ill.

[73] Assignee: Koehring Company, Milwaukee, Wis.

[22] Filed: Nov. 13, 1972

[21] Appl. No.: 306,330

[52] U.S. Cl. .................................. 73/49.3, 73/45.4
[51] Int. Cl. ........................................... G01m 3/34
[58] Field of Search ............... 73/41, 45, 45.1, 45.2, 73/45.4, 49.2, 49.3, 52, 37; 209/80, 79, 73, 74 R

[56] References Cited
UNITED STATES PATENTS

| | | | |
|---|---|---|---|
| 1,301,241 | 4/1919 | Fenlon | 73/49.3 |
| 1,590,736 | 6/1926 | Clark | 73/49.3 |
| 1,825,699 | 10/1931 | Landrum | 73/49.3 |
| 1,825,744 | 10/1931 | Landrum | 73/49.3 |
| 2,648,977 | 8/1953 | Mills | 73/52 |
| 3,650,145 | 3/1972 | Nelson | 73/37 |
| 3,683,677 | 8/1972 | Harris | 73/49.2 |
| 3,751,972 | 8/1973 | Haas | 73/45.4 |

Primary Examiner—Richard C. Queisser
Assistant Examiner—Joseph W. Roskos
Attorney, Agent, or Firm—Learman & McCulloch

[57] ABSTRACT

An apparatus for and a method of leak testing a fluid-filled, resilient enclosure including an enclosure deforming member for inwardly deforming a portion of the enclosure, to increase the pressure in the enclosure and force liquid outwardly through any openings in the enclosure and then releasing at least a part of the deformed portion, and sensing apparatus for sensing whether or not the released enclosure part returns to its undeformed position.

21 Claims, 5 Drawing Figures

ENCLOSURE LEAK TESTER AND METHOD

BACKGROUND OF THE INVENTION

This invention relates to a leak tester for a fluid-filled, thin-walled flexible enclosure such as a synthetic plastic milk container formed, for example, of polyethylene or polystyrene, and more particularly, to a leak tester which constricts and then releases a portion of the enclosure and then senses any change in the volumetric capacity of the enclosure by sensing whether or not the released portion returns toward its original position.

A system is disclosed in each of the present assignee's United States patent applications Ser. Nos. 154,058 and 284,035, filed in the United States Patent Office on June 17, 1971, and Aug. 28, 1972, now U.S. Pat. Nos. 3,744,212 and 3,791,894 respectively and incorporated herein by reference, which includes apparatus for forming a container by friction welding upper and lower vertically aligned container halves, apparatus for filling the container with a product, and apparatus for then sealing the container with a cap. Any faults in the containers, the caps and the seals between the caps and containers will show up as "leakers" as the containers are tipped and tumbled while being packed in cases by tumble packing apparatus such as that disclosed in the present assignee's copending application Ser. No. 276,068 filed July 28, 1972, now U.S. Pat. No. 3,788,029 and incorporated herein by reference. Leaking containers are vexatious since filled container cases are generally stacked four to five high and leaking containers in upper cases will contaminate the cases and containers below, the cooler storage area, other floors over which the cases are transported, and container display cases.

Accordingly, it is an object of the present invention to provide apparatus for determining which containers are leaking prior to shipment to prevent possible contamination of the container contents and to avoid problems in handling and storing such containers.

It is another object of the present invention to provide apparatus, in a system of the type described, for leak testing fluid-filled and capped containers adjacent the container filling and capping apparatus.

Still another object of the present invention is to provide a method of, and an apparatus for, leak testing a fluid-filled, resilient container by applying external pressure to individual containers to expel the fluid through any holes or openings therein, relieving the pressure, and thereafter sensing any change in the container volumetric capacity.

It is a still further object of the present invention to provide a leak tester of the type described which will test substantially 100 percent of the containers being filled in a high speed line operation.

Another object of the present invention is to improve customer satisfaction by eliminating leaking containers and thus enhance confidence in the product marketing agency.

It is yet another object of the present invention to provide apparatus for testing leaks in enclosures to rapidly determine manufacturing defects in the containers and eliminate a substantial number of "leakers" from being manufactured due to any one malfunction of the enclosure forming machinery.

Yet another object of the present invention is to provide a method of and an apparatus for leak testing a fluid-filled, flexible enclosure by constricting a portion of the enclosure to decrease the volumetric capacity of the enclosure and increase the pressure in the enclosure so that fluid will be outwardly forced through any openings in the enclosure, releasing the constricted portion of the enclosure and permitting it to return to its original position and sensing whether the released container portion returns to its original condition.

Other objects and advantages of the present invention will become apparent to those of ordinary skill in the art as the description thereof proceeds.

SUMMARY OF THE INVENTION

An apparatus for and a method of leak testing fluid-filled, resilient containers including means for applying external pressure to a portion of a fluid-filled enclosure to increase the pressure in the enclosure and force fluid outwardly through any openings in the enclosure, means for relieving the pressure on at least a part of the enclosure, and means for sensing a change in the container volumetric capacity by sensing flexing movement of the container part after the pressure is relieved.

The present invention may more readily be understood by reference to the accompanying drawings in which.

THE GENERAL SYSTEM DESCRIPTION

Figure 1:
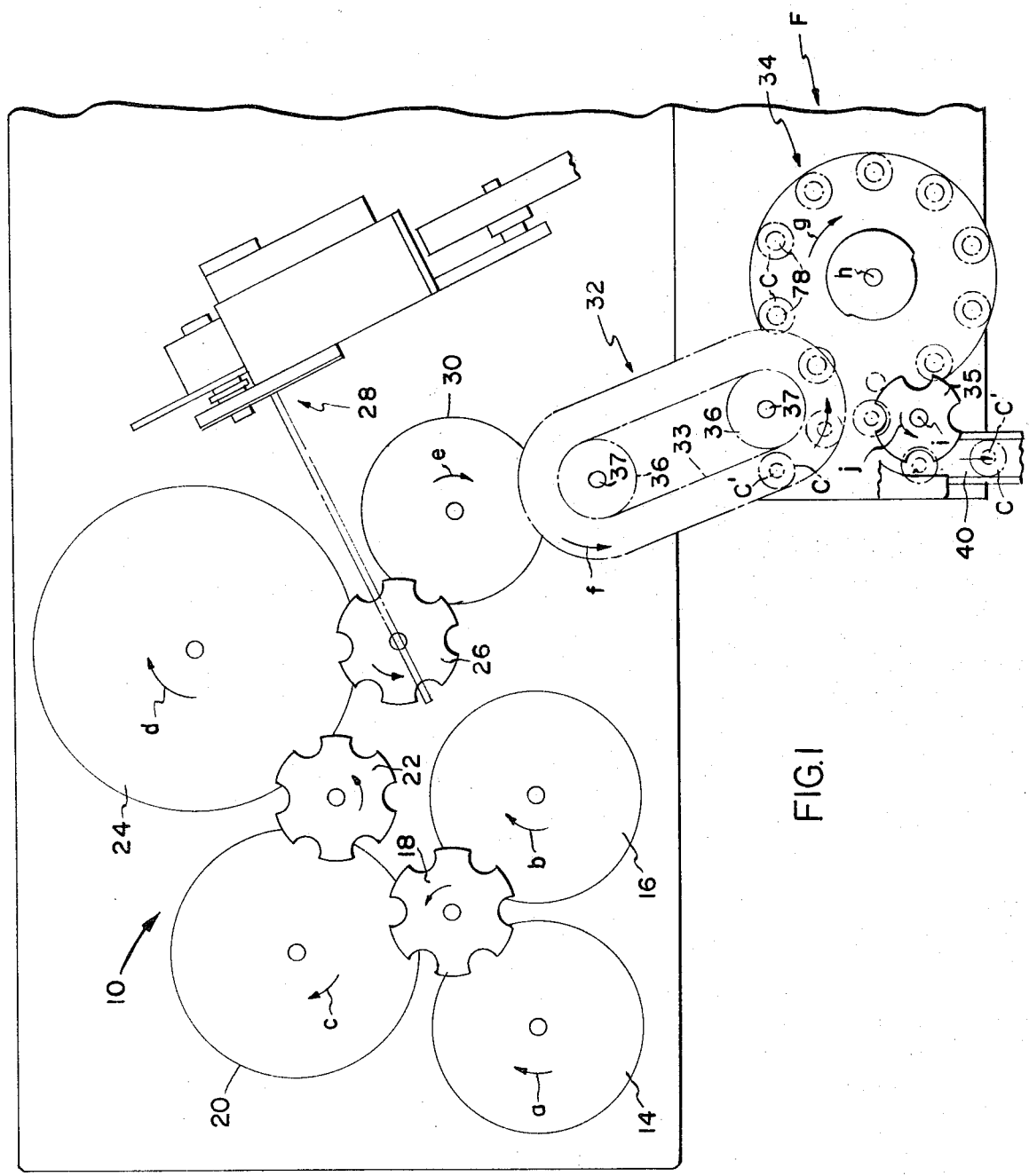
FIG. 1 is a top plan, schematic view of the over-all processing system in which apparatus constructed according to the present invention is incorporated.

Apparatus constructed according to the present invention is particularly adapted for use in the systems disclosed in the aforementioned copending U.S. Pat. Nos. 3,744,212 and 3,791,894. Such a system, generally designated 10, assembles plastic containers C, utilizing bulk supplies of nested container halves, fills the containers C with milk or other product, and caps and seals the open tops of the filled containers. The system 10 includes a support framework 12 mounting upper container half denesting apparatus 14 for clockwise rotation, in the direction represented by the arrow $a$, and lower container half denesting apparatus 16 for clockwise rotation, in the direction represented by the arrow $b$. The denesters 14 and 16 are more particularly described in the reference patent applications and the present assignee's copending United States patent application Ser. No. 154,079, filed June 17, 1971, now U.S. Pat. No. 3,735,896 which is incorporated herein by reference. The denesters 14 and 16 dispense upper and lower container halves to a star wheel assembly 18 which moves the denested container halves in vertical alignment to a container friction welding unit 20 which is more particularly described in the aforementioned patent applications and the present assignee's copending United States patent application Ser. No. 154,060 filed June 17, 1971, now U.S. Pat. No. 3,708,376 which is incorporated herein by reference. The friction welding unit 20 receives the upper and lower container halves and welds them together to form a container C as they are moving in an orbital, clockwise path represented by the arrow c.

A star wheel 22 receives the containers C from the spin welding unit 20 and moves them to a container filling unit 24 which is identical to the container filling unit disclosed in the aforementioned patent applications. The filler unit 24 introduces a supply of products, such as milk, to the containers as they move in a circular path of travel, represented by the arrow d, and then transfers the filled containers C to a star wheel assembly, generally designated 26. The star wheel assemblies 18, 22 and 26 are constructed identically to the star wheel assemblies disclosed in the aforementioned patent applications. While under the control of the star wheel assembly 26, each of the now filled containers C passes beneath the end of the container closure cap supply device, generally designated 28, which disposes one such cap C' over the top of each of the filled containers C. The cap supply apparatus 28 is identical to the cap supply apparatus disclosed in the aforementioned patent applications for supplying foil caps.

The filled containers, with the caps C' resting thereon, are then moved one-by-one to a heat sealer unit, generally designated 30, supported on the frame 12 for clockwise rotation in the direction of the arrow e. The heat sealing unit 30 is constructed identically to the heat sealing unit disclosed in the referenced U.S. Pat. No. 3,744,212 and the assignee's copending patent application Ser. No. 154,062 filed in the United States Patent Office on June 17, 1971, now U.S. Pat. No. 3,726,749 and incorporated herein by reference. The heat sealing unit 30 seals the caps C' to the containers C and delivers the sealed containers C to an endless conveyor, generally designated 32, which receives the sealed enclosure, comprising containers C sealed by caps C', and moves them in a path of travel, represented by the arrow f, to leak testing apparatus, generally designated 34, constructed according to the present invention.

The leak testing apparatus 34 is mounted on the frame for clockwise rotation, in the direction of the arrow g about an axis h, and moves the leak tested containers C to a frame supported star wheel assembly, generally designated 35. The star wheel assembly 35 rotates about an axis i, in the counterclockwise rotation represented by the arrow j, and receives the non-leaking containers C and transfers them to a discharge conveyor, generally designated 40. The containers which are "leakers" are discharged over the side of the leak testing apparatus upstream of the star wheel assemblies 35.

Figure 2:
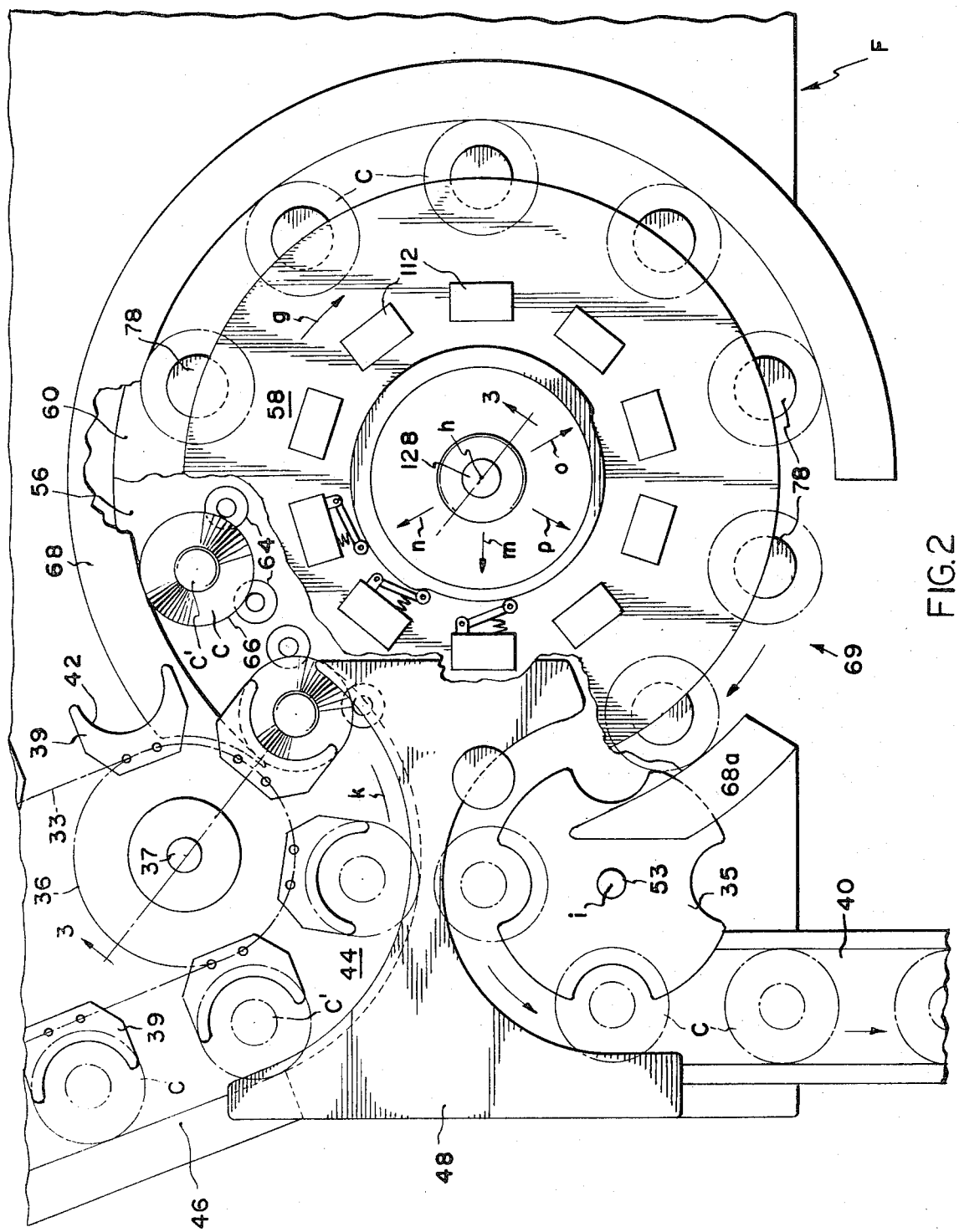
FIG. 2 is an enlarged top plan view of the leak testing apparatus constructed according to the present invention, parts of the leak testing apparatus being broken away to more clearly illustrate underlying portions thereof.
Figures 3, 4:
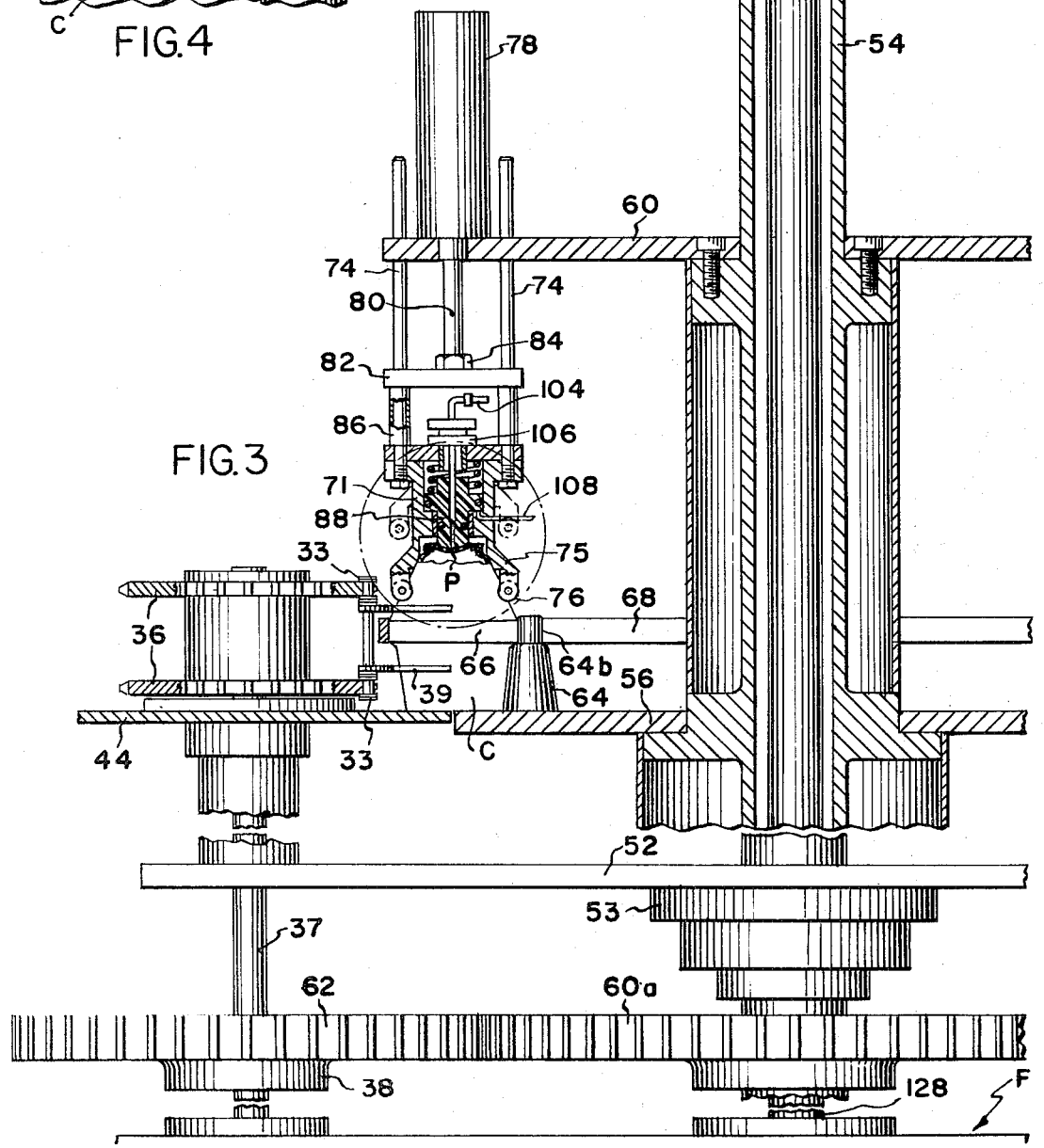
FIG. 3 is a sectional side elevational view of the leak testing apparatus, taken along the lines 3—3 of FIG. 2.
FIG. 4 is a still further enlarged sectional side view of the portion of the leak testing apparatus encircled in chain lines in FIG. 3.

Referring now more particularly to FIGS. 2, 3, and 4, the conveying system 32 includes a pair of upper and lower endless chains 33 trained around pairs of upper and lower sprocket wheels 36 fixed to shafts 37 journaled in frame supported bearings 38 (FIG. 3). The chains 33 mount container receiving plates 39 having semi-circular pockets 42 which receive containers C and move them along an underlying, frame mounted support plate 44. A frame supported guide rail 46, extending the length of the conveyor 32, and a frame supported plate 48, adjacent the discharge end of the conveyor 32, are provided for guiding the containers C as they are moved along by the chains 33 and plates 39. The plate 48 guides the capped containers C, in the direction of the arrow k, to the leak testing unit, generally designated 34.

THE LEAK TESTING APPARATUS

The leak testing apparatus 34 is mounted on a pair of frame supported, vertically spaced, stationary support plates 52 mounting bearings 53 that journal an upstanding tubular shaft 54 which mounts a circular, valve mounting plate 58 at the upper end thereof, an underlying, circular, cylinder support plate 60, and a circular container support platform 56, underlying the cylinder support plate 60. The tubular shaft 54 is driven by a gear 60a which is fixed to the lower end thereof and meshes with a gear 62 fixed to the lower end of at least one of the shafts 37 which mounts the sprocket wheels 36 of the conveyor assembly 32. The gears 60a and 62 are driven by a gear train which drives the units 14 through 30, as described in the referenced patent applications, so that the containers C are moved in timed relation.

The container support platform 56 mounts a plurality of pairs of upstanding posts 64, each pair of posts 64 cooperating to receive a portion of a container C transferred to the platform 56. As illustrated in FIG. 3, the posts 64, which upwardly converge complementally to the downwardly converging bottom half of the container C, includes a reduced upper end 64b for receiving an enlarged diameter mid-portion 66 of a container C. A frame supported curvilinear, container stripping and guiding rail 68, 68a is disposed in the path of a container C being moved by the conveyor assembly 32 so as to strip the containers C from the pockets 42 as they move in the direction of the arrow k and to guide them in the circular path represented by the arrow g as they are rotated on the container support plate 56. Guide rail 68, 68a is interrupted as at 69 to provide a discharge opening through which leaking containers are centrifugally ejected from the machine.

The leak testing apparatus 34 includes a plurality of circumferentially spaced, container constricting or deforming heads, generally designated 70, for decreasing the volumetric capacity of the capped containers C and increasing the pressure in the capped containers C. The container deforming members 70 each include a hollow, cylindrical housing 71 fixed to a guide plate 72 slidably mounted on a pair of vertical guide rods 74 depending from the cylinder support plate 60.

The cylindrical housing 71 includes, at its lower end, outwardly diverging roller support portions 75 rotatably mounting nylon rollers 76 which flex or deform the upper side wall 63 of the container C inwardly when the constricting member 70 is in the lowered position, illustrated in FIGS. 3 and 4.

Apparatus is provided for individually moving each of the container deforming heads 70 between the lowered container deforming position, illustrated in solid lines in FIG. 3, and a raised container releasing position, illustrated in chain lines in FIG. 3, and comprises a pneumatically operated, double acting, solenoid actuated, spring returned cylinder 78 supported on the cylinder support plate 60 and having a piston rod 80 adjustably connected to a guide plate 82, slidably received on the vertical guide rods 74, by a locking nut 84. A spring 79 (FIG. 5) causes the piston rod 80 to be retracted when air pressure to the cylinder 78 is interrupted. The guide plates 72 and 82 are connected by spacer members 86 receiving the guide rods 74.

Slidably received in the cylinder housing 71 is a cap deforming piston, generally designated 88, having an enlarged diameter portion 92, a reduced diameter, spring receiving portion 91, and a reduced diameter nozzle portion 93 slidably received in a bushing 90 provided in the cylinder 71. A pair of O-rings 94 and 93a, which provide airtight seals between the cap deforming piston 88 and cylinder 71 and between the nozzle 93 and bushing 90, respectively, permit relative sliding movement of the piston 88 and cylindrical housing 71. A compression spring 96 reacts between the guide plate 72 and the enlarged diameter portion 92 of the cap deforming piston 88 for maintaining the piston in the cap flexing position illustrated in FIG. 3.

The cap deforming piston 88 includes a bore 100 therethrough having an enlarged counterbore 102 at its upper end receiving an air conducting conduit 104 fixed to a nut 106 on the guide plate 72. The conduit 104 will slide in the counterbore 102 of the cap deforming piston 88 when the cap deforming piston 88 is moved relative to the conduit 104. An air conducting conduit 108 is provided in the lower end of the cylinder housing 71 for admitting air to the cylindrical housing 71 to force the cap deforming piston 88 upwardly away from the cap C' against the biasing force of the spring 96. The cap deforming piston and sensor 88, which may suitably be formed of synthetic plastic material, has a diameter less than the inside diameter of the upper opening O in the container C and is of sufficient length that the housing cylinder 71 is in the lower position, illustrated in FIG. 1, the lower end 93a of the nozzle 93 will flex or bow the central part P of the container C' inwardly to the position illustrated in FIG. 3.

Mounted atop the valve mounting plate 58 for controlling the operation of the head raising and lowering cylinders 78 are a plurality of circumferentially spaced, openable and closeable valve assemblies, generally designated 110, each including three vertically stacked, air-valves 112, 114 and 116 actuated by cam follower rollers 115 rotatably mounted on support arms 118 which are pivotally mounted on the valves 112, 114, and 116 by pivot pins 120. The valves 112, 114 and 116 may suitably comprise three-way "Versa" type air valves. Springs 123 bias the cam follower rollers 116 against three vertically stacked, stationary cams 122, 124, and 126 which sequentially actuate the orbiting air-valves 112, 114, and 116 respectively, for a purpose to become immediately apparent. The cams 122, 124, and 126 are fixed to a frame supported, stationary vertical shaft 128 extending inside the tubular shaft 54 and fixed to the frame F.

The pitch between the constricting members 70 is equal to the pitch between the pockets 42 in the conveyor 32. The leak testing apparatus 34 and conveyor 32 are driven in timed relation by the meshing gears 60a and 62. The tested containers C which are "non-leakers" are removed from the leak tester 34 to the discharge conveyor 40 by the guide plate 48, extending into the path of the containers C, and star wheel assembly 35. When a "leaker" is detected, the entire container deforming assembly 70 is moved upwardly to a remote position so that the leaking container will be thrown from the leak tester support platform 56 by centrifugal force.

THE FLUID CONTROL CIRCUIT

Figure 5:
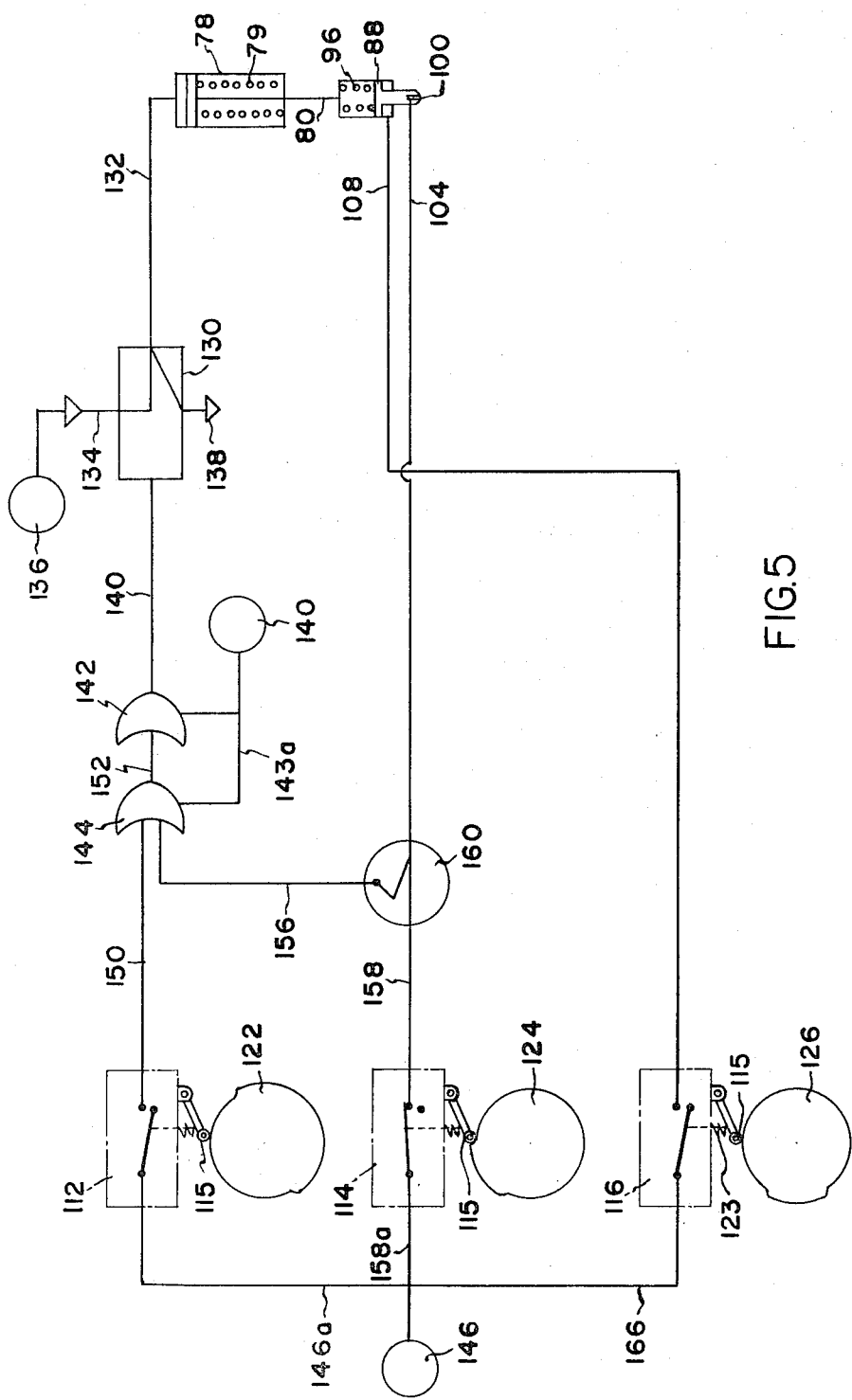
FIG. 5 is a schematic diagram of a fluid control circuit for operating the apparatus illustrated in FIGS. 1 - 4.

Referring now more particularly to FIG. 5, the control circuit for operating each container deforming head moving cylinder 78 includes a three-way output valve 130 having an output line 132, connected to the upper or advance end of the cylinder 78 for moving the piston 80 downwardly, and a supply line 134 connected with a pneumatic source 136 which will supply air at 60 p.s.i., for example. In one position of the valve 130, pressurized air from the source 136 is communicated to the cylinder 78. The valve 130 may suitably comprise a "Flier" type valve, model 38A2 sold by Double A Products, Manchester, Mich. The valve 130 includes a vent orifice 138 which will vent the supply air from the source 136 when the valve 130 is in another position.

The position of the valve 130 will be determined by whether or not pilot air is communicated to the valve 130 via a conduit 140 connected between the valve 130 an the output end of a fluidic valve 142. The valve 142 has its input end connected to the output end of a similar fluidic valve 144 by a conduit 152. Operating air for the valves 142 and 144 is supplied by a source 141, supplying air at 3 pounds p.s.i., for example, via lines 143 and 143a. The fluidic valves 142 and 144 may suitably comprise VISI LOGIC module valves, manufactured by Double A Products, Manchester, Mich., as model No. FLB-N8-A1.

When air is supplied to line 152 via line 143a and fluidic valve 144, the fluidic valve 142 operates to interrupt the supply of air from the souce 141 to the valve 130 so that the valve 130 switches to a position in which air from supply 136 is vented through the vent orifice 138. When the supply of air to line 152 is interrupted, the fluidic device 142 will switch and supply air from the reservoir 141 to the line 140 to actuate the valve 130 and cause fluid to be directed from the reservoir 136 along the line 132 to the cylinder 78. Air will be supplied at line 152 to fluidic valve 142 whenever air is not communicated to the fluidic valve 144 via either of a pair of input lines 150 and 156. On the other hand, the fluidic valve 144 operates to interrupt the supply of air from source 141 to the line 152 whenever air is communicated to the valve 144 via either of the air supply lines 150 and 156. The line 150 is connected to the output of the cam operated "head-down" valve 112 which is closed when the container deforming member 70 is to be lowered. The input end of the valve 112 is connected to an air source 146 via a conduit 146a.

The circuit for controlling the raising of each container deforming member 70 includes the normally closed "head-up" valve 114 connected to the pneumatic source 146 via a conduit 158a and to junction box 160 via a conduit 158. The junction box 160 has an output connected with the line 156 and an output connected with the sensing line 104. The normally closed "head-up" valve 114 is opened by the cam 124. The junction box 160 permits air to flow from the conduit 158 to the sensing conduit 104 and the outlet orifice or port 100 when the port 100 in the nozzle 93 is unrestricted. The junction box 160 will divert the free flow of air to the line 156 when the orifice 100 becomes slightly restricted. This, of course, occurs when the cap C' is initially deformed to the position illustrated in FIG. 3 and also when the cap C' follows the upward movement of the piston 88 to the position illustrated in FIG. 4, during the testing operation, denoting a container without leaks.

The circuit for causing operating air to be directed to the cap deforming piston 88 so as to drive it upwardly and release the deformed container cap C', includes the "sensor-up" valve 116 having its input connected to the source 146 via a line 166 and its output connected to the line 108 connected to the cylindrical housing 71 of the container deforming member 70. The "sensor-up" valve 116 is normally open and is closed when it is actuated by the cam 126.

THE OPERATION

Containers C are formed by the friction welding apparatus 20, filled with milk or the like by container filling apparatus 24, capped by capping apparatus 28, and sealed by cap sealing apparatus 30 as is more particularly described in aforementioned patent applications. The filled and capped containers C are discharged by the sealing unit 30 onto the conveyor assembly 32 which receives containers C in the pockets 42 and moves them, in the direction of the arrow f, to the leak testing apparatus 34.

As the containers C are being moved along the discharge end of the conveyor 32, in the direction of arrow k, the stripper rail 68 strips the containers C from the conveyor 32 and moves them onto the rotating container support platform 58 so that each container C' is positioned between a pair of upstanding posts 64. A container, located in the position represented by the arrow m (FIG. 2), will be referred to as being in the 12 o'clock position. As the leak testing apparatus 34 continues to rotate to move a container C to the 2 o'clock position, represented by the arrow n, the cam 122 will close the "head-down" valve 112 (FIG. 5) causing fluid to be directed to the fluidic valve 144 via conduit 150. This will cause the fluidic valve 144 to switch conditions and interrupt the supply of fluid to the fluidic valve 142 along the line 152. This causes the valve 142 to switch conditions and interrupt the supply of fluid to the line 140. This will cause the valve 130 to switch conditions so as to communicate cylinder operating air from the source 136 to the cylinder 78 via the line 132. This will force the piston 80 downwardly and move the container deforming member 70 to the position illustrated in FIG. 3. The nylon rollers 76 will flex or deform the upper wall 63 of the container C inwardly thereby decreasing the volumetric capacity of the container C and increasing the pressure in the container C. At the same time, the cap flexing or deforming piston 88 is moved into engagement with the cap C' to flex or bow it inwardly to the position illustrated in FIG. 3 thereby further increasing the pressure and decreasing the volumetric capacity of the container C. If such a filled enclosure has a fault in either the container body C, the closure cap C' or the seal therebetween, the deforming or constricting action of the nylon rollers on the container C and the cap deforming piston 88 on the cap C' causes container contents and air in the container to be outwardly expelled through the faults.

When the cap deforming piston 88 is moved downwardly to inwardly deform the container cap C', the port 100 in the nozzle 93 will be blocked so that operating air in the junction box 160 will be forced to the conduit 156. When pressurized fluid is directed to the line 156, the fluidic valve 144 will continue to be maintained in the same position so that the cylinder 78 remains in the down position even though the "head-down" valve 116 opens. When the container C is moved to the 8 o'clock position, represented by the arrow o, the cam 126 will cause the "sensor-up" valve 116 to close and force operating air along the conduit 108 to the underside of the piston 88 moving it upwardly against the biasing force of the yieldable spring 92 to release the deformed portion of the container cap C'. When the cap deforming piston 88 is moved upwardly and the capped container has no leaks, the closure cap C' will follow the sensor 88 upwardly thereby continuing to restrict the orifice 100 signaling that the container is a non-leaker. As long as orifice 100 is blocked, cylinder rod 80 will remain in its extended position and the deforming force applied by member 70 will hold the leak-tight container C firmly against support member 56 while the container is carried by the rotating support member 56 past discharge opening 69. Such a "non-leaking" container will be advanced until it reaches approximately the 10 o'clock position, represented by the arrow p, at which time the cam 124 will actuate the valve 114 interrupting fluid to the "head-up" valve 114. This will interrupt the supply of fluid to the line 156 and thus fluidic valve 144 will switch conditions and cause fluid to be supplied from the line 143a to the line 152. This will cause the fluidic valve 142 to switch conditions so that no fluid will be supplied to the line 140. When pilot pressure to the valve 130 is interrupted, the valve 130 will vent the supply of air from source 136 so that the cylinder return spring 79 will raise the cylinder rod 80 and the container deforming member 70 to the raised position permitting the container C to be removed by the output star wheel 35 and stripping plate 48.

If the capped container C is a "leaker," fluid and air in the container will be outwardly forced through the faults when the container C is subjected to the external pressure of the container deforming members 70. The container deforming members 70 are held in the container deforming position through approximately 180° of their rotation on the leak testing apparatus so that sufficient fluid is forced through any faults and the pressure within the container C can stabilize at a lower pressure. When this occurs, there will be insufficient pressure in the container to permit the cap C' to return and follow the sensor 88 upwardly. Consequently the port 100 will be opened and the fluid in the line 156 will pass through line 104 and escape through the unrestricted port 100. When the air freely passes through the port 100, the junction box 160 will sense this condition to substantially interrupt the flow of operating air to the line 156 and fluidic valve 144 in response to the decreased pressure in the line 104 and port 100. The fluidic device 144 will sense the absence of air in line 156 and will switch conditions in response to this condition, causing the fluidic device 142 to switch conditions. This will cause the valve 130 to switch conditions and interrupt the supply of air to the line 132 permitting the cylinder spring 79 to return the piston rod 80 and the container deforming member 70 to the raised position before the container is rotated into alignment with discharge opening 69. Raising of the container deforming member 70 relieves the pressure holding the leaky container against support member 56 and as the container is rotated into alignment with discharge opening 69, the centrifugal force acting on the released container is sufficient to centrifugally impel the container through discharge opening 69.

It is to be understood that the drawings and descriptive matter are in all cases to be interpreted as merely being illustrative of the principles of the invention, rather than as limiting the same in any way, since it is contemplated that various changes may be made in various elements to achieve like results without departing from the spirit of the invention or the scope of the appended claims.

What is claimed is:

1. A method of leak testing a fluid-filled, resilient container having a resiliently flexible container cap sealing said container comprising the steps of:

deforming a portion of the container and said cap inwardly of said container to decrease the volumetric capacity of the container and increase the pressure in the container so that fluid in the container will be forced through any unsealed openings in the container;

releasing the deforming force on said cap to permit the cap to return to its undeformed position while maintaining the deforming force on said portion of said container; and sensing whether or not the cap returns to its undeformed position.

2. The method of claim 1 wherein said deforming of said cap includes moving a fluid emitting nozzle against said cap to move it inwardly, said releasing step includes moving said nozzle outwardly to release said cap, said sensing step includes sensing whether or not the nozzle remains blocked by said cap when said cap is released.

3. The method of claim 2 wherein said deforming step includes inwardly moving a portion of the container, said releasing step includes releasing the container portion permitting it to return to its original position.

4. The method of claim 3 wherein the moving of the container portion is accomplished by moving container deforming members into engagement with the container to move it inwardly, said releasing step including moving said container deforming members to a container releasing position away from said container when the cap does not return to its original position.

5. Apparatus for leak testing a fluid-filled, flexible enclosure comprising:

means for supporting said fluid-filled enclosure;

means movable between an outer position and an inner position for deforming a portion of the enclosure to decrease the volumetric capacity of the enclosure and increase the pressure in the enclosure so that fluid will be forced through any unsealed openings in the enclosure;

means for moving said deforming means from said outer position to said inner position to deform said portion of said enclosure and for returning at least a part of said deforming means to said outer position to permit a part of the deformed portion to return to its non-deformed position; and means for sensing whether said part of said deformed portions returns to its non-deformed position.

6. The apparatus set forth in claim 5 wherein said enclosure includes a container having an opening covered by a cap, said deforming means includes means for inwardly deforming a portion of said cap, constituting said enclosure part, from an outer position to an inner position and then releasing it; said sensing means including means for sensing whether the released cap portion returns to its outer position.

7. The apparatus set forth in claim 6 wherein said cap deforming means includes a nozzle having a fluid emitting port, said means for moving said deforming means includes means for moving said nozzle against said cap portion so that said port is blocked when said cap portion is moved inwardly, said sensing means includes means for sensing the fluid pressure in said port to determine whether said cap portion is blocking said port when said cap portion is released.

8. The apparatus set forth in claim 7 wherein said deforming means comprises means movable between a removed position and a container deforming position for inwardly deforming a portion of said container;

means for moving said container deforming means from said removed position to said container deforming position and responsive to said sensing means for returning said container deforming means to said removed position when the nozzle is in said outer position and said port is not blocked by said cap portion.

9. Leak testing apparatus for containers having an opening covered by a cap and filled with fluid comprising:

means for supporting a fluid-filled and capped container;

means movable between an outer position and an inner position for deforming a portion of the container to reduce the volumetric capacity of the container and increase the pressure in the container to force fluid through any unsealed openings;

cap deforming means movable between an outer position and an inner position for inwardly deforming a portion of the cap from an outer position to an inner position when the container portion is in its inner position;

means for moving said constricting means from said outer position to said inner position;

means for moving said cap deforming means from said outer position to said inner position and for thereafter returning it to said outer position to release said cap portion and permit it to return to its outer position; and sensing means for sensing whether said cap portions returns to its outer position.

10. The apparatus of claim 9 including means mounting said cap deforming means for movement with said container deforming means but permitting said cap deforming means to be moved relative to said container deforming means, said cap deforming moving means moving said cap deforming means away from said cap and relative to said container constricting means to release the cap portion and permit it to return to its outer, undeformed position.

11. The apparatus of claim 10 wherein means is provided for yieldably urging said cap deforming means toward said container, and said means for moving said cap deforming means overcomes the force of said yieldable means.

12. The apparatus of claim 10 wherein said sensing means includes port means in said cap deforming means connected with fluid pressure means, and means responsive to the pressure in said port means for operating said means for moving said container deforming means in such a manner as to withdraw said container constricting means to said removed position.

13. The apparatus of claim 10 wherein said support means is mounted for movement in an endless path of travel, said container deforming means being mounted above said container deforming means for movement in an endless path of travel in timed relation with said support means so that said container deforming means is maintained in vertical alignment with said containers on said support means.

14. The apparatus of claim 13 wherein said support means is rotatable about a vertical axis, said container deforming means is mounted on said support means for rotary movement therewith, said means for moving said container deforming means includes means on said support means for moving said container deforming means relative to said support means between a position removed from the container and a position inwardly deforming the upper end of the container on said support means, and means responsive to rotation of said support means for moving said deforming means to said inner deforming position at one psition of rotation of said support means and for moving said deforming means to said outer position in another position of rotation; said cap deforming means being moved to said outer position interjacent said positions of rotation.

15. Apparatus for leak testing a fluid-filled, flexible enclosure comprising:
means for applying external pressure by inwardly deforming at least two portions of the enclosure to increase the pressure within the enclosure and force fluid through any unsealed openings in the enclosure;
means for relieving at least a portion of the pressure by releasing the deforming force from one of the two deformed portions while maintaining the deforming force at the remaining deformed portions; and
means for sensing whether or not the portion from which the deforming force is relieved returns to its original position.

16. The apparatus set forth in claim 15 wherein said sensing means includes a port in a portion of said enclosure deforming means connected with a source of pressurized fluid, said port being positioned to be blocked by said released, enclosure portion when fluid is not forced through any unsealed openings in the enclosure and positioned so as not to be blocked when fluid is forced through said openings.

17. The apparatus set forth in claim 15 wherein said pressure applying means comprises first and second, relatively movable, pressure applying portions mounted for movement between positions removed from the enclosure and enclosure flexing positions; at least a portion of said pressure sensing means being movable with said first pressure applying portion, and means for moving said first pressure applying portion away from said enclosure to release a part of the flexed enclosure portions so that said sensing means can sense whether said part returns toward its original position.

18. The apparatus set forth in claim 17 including means responsive to said sensing means for moving said first and second pressure applying means to said removed positions when said part of said enclosure portion does not return to its undeformed position.

19. The apparatus set forth in claim 15 wherein said pressure applying means includes a fluid pressure emitting nozzle and means for moving said nozzle against a part of said enclosure to deform it inwardly, said releasing means includes means for moving said nozzle outwardly to a removed position, said sensing means includes means for sensing the pressure in the nozzle in the removed position; and means is responsive to said sensing means for moving said pressure applying means to an enclosure releasing position.

20. A method of leak testing a fluid-filled, flexible enclosure comprising the steps of:
applying external pressure to at least two separated portions of the enclosure to deform the enclosure to thereby increase the pressure within the enclosure and force fluid through any unsealed openings in the enclosure; and
releasing the external pressure applied to one of the two separated portions, and maintaining the external pressure applied to the remaining separated portions of the enclosure subsequent to the relieving of the external pressure from said one portion when said one portion returns to its original undeformed position and releasing the external pressure from said remaining separated portions when said one portion does not return to its original position upon the release of external pressure therefrom.

21. The method defined in claim 20 comprising the further steps of conveying the enclosure along a circular path while applying and releasing external pressure to the enclosure, and employing the external pressure applied to said remaining portions of said enclosure to prevent the enclosure from being centrifugally discharged from said path upon the release of external pressure from said one portion.

* * * * *

UNITED STATES PATENT OFFICE
CERTIFICATE OF CORRECTION

Patent No. 3,847,014            Dated November 12, 1974

Inventor(s) Robert J. Mistarz

It is certified that error appears in the above-identified patent and that said Letters Patent are hereby corrected as shown below:

Column 3, line 27, before "top", insert --open--.

Column 10, line 47, cancel "constricting" and insert --deforming--.

Column 10, line 62, cancel "constricting" and insert --deforming--.

Column 11, line 9, cancel "constricting" and insert --deforming--.

Column 11, line 29, change "psition" to --position--.

Signed and sealed this 7th day of January 1975.

(SEAL)
Attest:

McCOY M. GIBSON JR.           C. MARSHALL DANN
Attesting Officer             Commissioner of Patents